United States Patent
Kusej et al.

(10) Patent No.: US 8,145,400 B2
(45) Date of Patent: Mar. 27, 2012

(54) METHOD FOR CONTROLLING A HYDRAULIC ACTUATOR COMPRISING A RAPID DRAIN VALVE AND A CONTROL SYSTEM AND A FRICTION COUPLING COMPRISING AN ACTUATOR OF THIS TYPE

(75) Inventors: Albert Kusej, Graz (AT); Johannes Quehenberger, Saalbach (AT); Anton Hofer, Graz (AT)

(73) Assignee: MAGNA Powertrain AG & Co KG, Lannach (AT)

( * ) Notice: Subject to any disclaimer, the term of this patent is extended or adjusted under 35 U.S.C. 154(b) by 1066 days.

(21) Appl. No.: 11/667,245

(22) PCT Filed: Nov. 8, 2005

(86) PCT No.: PCT/AT2005/000444
§ 371 (c)(1),
(2), (4) Date: Feb. 26, 2008

(87) PCT Pub. No.: WO2006/047806
PCT Pub. Date: May 11, 2006

(65) Prior Publication Data
US 2008/0255740 A1 Oct. 16, 2008

(30) Foreign Application Priority Data
Nov. 8, 2004 (AT) .................. GM805/2004

(51) Int. Cl.
*B60W 10/02* (2006.01)
(52) U.S. Cl. ........... 701/68; 701/67; 477/168; 477/174
(58) Field of Classification Search .............. 701/67, 701/68; 477/166, 168, 174
See application file for complete search history.

(56) References Cited

U.S. PATENT DOCUMENTS

| | | | | |
|---|---|---|---|---|
| 5,060,768 A | * | 10/1991 | Yamashita et al. | 477/39 |
| 5,190,130 A | * | 3/1993 | Thomas et al. | 477/176 |
| 5,679,099 A | * | 10/1997 | Kato et al. | 477/176 |
| 6,086,509 A | * | 7/2000 | Johnson et al. | 477/97 |
| 6,647,332 B1 | | 11/2003 | Esterby et al. | |
| 6,681,912 B2 | * | 1/2004 | Suzuki et al. | 192/85.41 |
| 2004/0260444 A1 | * | 12/2004 | Winkelmann et al. | 701/67 |
| 2008/0215219 A1 | * | 9/2008 | Porzel et al. | 701/68 |
| 2011/0112737 A1 | * | 5/2011 | Neelakantan et al. | 701/67 |

FOREIGN PATENT DOCUMENTS

| | | |
|---|---|---|
| DE | 100 91 84 | 12/1996 |
| DE | 101 04 109 | 9/2002 |
| EP | 034 82 70 | 12/1989 |
| EP | 1 236 918 A | 9/2002 |
| EP | 1256478 | 11/2002 |
| WO | 2004/040158 A | 5/2004 |

* cited by examiner

*Primary Examiner* — Joseph C Rodriguez
(74) *Attorney, Agent, or Firm* — Harness, Dickey & Pierce, P.L.C.

(57) ABSTRACT

A method of controlling a hydraulic actuator of a friction coupling that includes a pump, which is driven by an electric motor, a pressure line, which contains a non-return valve and which runs from the pump to an actuator cylinder with an actuator piston that acts on the friction coupling. A rapid drain valve has a flow connection to the actuator cylinder and contains a slide that responds to the pressure prevailing on the side of the pump that faces the slide. To optimize the dynamic and static control behavior of the actuator, a control variable is determined for the electric motor from the target pressure and the actual pressure in the actuator cylinder. At least two different control algorithms are executed, depending on whether the difference between the target pressure and the actual pressure is positive or negative.

23 Claims, 4 Drawing Sheets

METHOD FOR CONTROLLING A HYDRAULIC ACTUATOR COMPRISING A RAPID DRAIN VALVE AND A CONTROL SYSTEM AND A FRICTION COUPLING COMPRISING AN ACTUATOR OF THIS TYPE

CROSS-REFERENCE TO RELATED APPLICATIONS

This application is a National Stage of International Application No. PCT/AT2005/000444, filed Nov. 8, 2005, and which claims the benefit of Austrian Utility Model Application No. GM 805/2004, filed Nov. 8, 2004. The disclosures of the above applications are incorporated herein by reference.

FIELD

The invention relates to a method for controlling a hydraulic actuator of a friction clutch which comprises a pump driven by an electric motor controlled by a control system, a pressure line including a check valve and running to an actuator cylinder having an actuator piston, with the pressure in the actuator cylinder having to be controlled or feedback controlled, and a fast drain valve including a slider responsive to the pressure prevailing at the side of the pump facing it. In this connection, in particular the actuator of a multiple-disk clutch in the drivetrain of a motor vehicle is being thought of, on which particular demands are made due to the special characteristics of such clutches and to the special demands in motor vehicles with driving dynamic systems.

BACKGROUND

The statements in this section merely provide background information related to the present disclosure and may not constitute prior art.

The special demands on the controllability of friction clutches are present both with respect to the precision of the setting of a specific torque and with respect to the speed of the control. The latter in particular on the release of the clutch, for instance on an ABS intervention or an ESP intervention. Furthermore, the electric motor should use as little energy as possible over all, that is it should also only run when necessary. There is also the demand for intrinsic safety. This means that the most secure state (usually that is the released clutch) should be adopted automatically in the event of system failure.

These demands also require an embodiment of the actuator in accordance with the preamble of the first claim, such as is, for example, the subject matter of WO 2004/040158 A2 of the applicant. Further details can be seen from this. An actuator of this type is cost-effective because the control valves required with conventional actuators can be dispensed with. The control of the electric motor for the actuation of the actuator is, however, demanding from a technical control viewpoint and is the subject of the present invention, which can be used independently of the specific construction and of the control of the electric motor itself.

SUMMARY

The object underlying the invention is thus to teach a method and a control system that permits the precise setting of a specific pressure, the very fast lowering of the pressure and the maintaining of the pressure using a minimum of electrical energy and is moreover intrinsically safe. The latter means that the pressure reliably falls on a failure of the control.

This is achieved in accordance with the invention in that a control variable for the electric motor is determined from the desired pressure and the actual pressure in the actuator cylinder, with at least two different control algorithms being carried out in dependence on the sign of the difference of the desired pressure and actual pressure. The control variable for the electric motor depends on its specific construction and control. It can be a permanently excited direct current motor with control of the current strength or voltage or any other controllable electric motor. The sign of the difference is to be understood as the sign preceding it. It is positive when the desired pressure is larger than the actual pressure and negative in the reverse case. It is zero when the pressure difference is smaller than a predetermined tolerance, with this also being able to be preset by a higher level system (for example a driving dynamics controller). The different control algorithms first permit a precise setting of a specific pressure with a positive sign and an extremely fast lowering of the pressure with a negative sign, and also additional measures to maintain the respective pressure in as energy saving a manner as possible. This takes the fact into account that the control path in the two operating states has a different structure and behaves differently due to the interaction of the check valve and the fast drain valve.

To build up the pressure with a positive sign, the control algorithm compares the desired pressure in the actuator cylinder with the actual pressure and forms a control variable for the electric motor. The control parameters are adapted in dependence on operating parameters, in particular in dependence on the pressure in the actuator cylinder. The control algorithm is preferably that of a PID control; however, it can also be that of a state control or fuzzy logic. The control parameters of the controller are to be selected accordingly to match the properties of the control path comprising, on the build of pressure, electric motor, pump, check valve, pressure cylinder and friction clutch. The adaptation takes the fact into account that the package stiffness of the whole clutch (in other words: the spring characteristic) is highly non-linear over the closing path of the clutch. It breaks down into three part regions having greatly differing gradients.

In a further development of the control algorithm on the build up of pressure (positive sign), it is that of a cascade controller, with a desired speed of the electric motor being determined in a first controller from the difference of the desired pressure and actual pressure in the actuator cylinder, a desired electrical parameter being determined in a second controller from the difference of the desired speed of rotation and the actual speed of rotation of the electric motor, and a control variable with which the electric motor is controlled being determined in a third controller from the difference of the desired electrical parameter and the actual electrical parameter.

The cascading has the following advantages: more favorable dynamics because the time constants of the individual controllers can be adapted to the respective time constants of the control path; better control elimination of variable disturbance due to the internal feedback; protection of the electric motor from overloading. A further improvement is achieved with the cascading in that the control parameters of the first controller are adapted in dependence on operating parameters, in particular on the pressure in the actuator cylinder. Instead of the adaptation, a plurality of controllers with different control parameters and a subsequent selection can also be used.

For the pressure reduction (negative sign), the control algorithm forms, in a first variant, a control variable for the electric motor by a comparison of the desired position of the slider of the fast drain valve with its actual position, with the desired position of the slider primarily being formed from the values of the desired pressure and the actual pressure in the actuator cylinder. In this connection, the actual position of the slider is determined from one or more operating parameters of the actuator, for instance from a parameter corresponding to the angle of rotation of the electric motor. The position of the fast drain valve can, however, also be measured.

For the pressure reduction (negative sign), the control algorithm forms, in a second variant, a control variable for the electric motor by a comparison of the desired gradient with the actual gradient of the pressure in the actuator cylinder, with the desired gradient being formed as a function of the desired pressure and the actual pressure in the actuator cylinder by a time derivation of the actual pressure in the actuator cylinder.

In a further development of the control algorithm on the reduction of pressure (negative sign), it is that of a cascade controller, with a desired speed of the electric motor being determined in a first controller from the difference of the desired position and the actual position of the electric motor, a desired electrical parameter being determined in a second controller from the difference of the desired speed of rotation and the actual speed of rotation of the electric motor, and a control variable with which the electric motor is controlled being determined in a third controller from the difference of the desired electrical parameter and the actual electrical parameter. The aforesaid advantages of a cascade control are also utilized again here.

In a further development of the method in accordance with the invention, special measures are also to be provided for the maintenance of the pressure in the actuator cylinder (when the sign of the difference of the desired pressure and actual pressure is within a predetermined tolerance). In a first variant, the control algorithm then monitors the actual pressure in the actuator cylinder and forms, with a defined pressure drop, a control variable for the electric motor which accelerates it from a reduced speed or sets it in motion when at a standstill. In a second variant, the control algorithm monitors the position of the slider and forms a control variable for the electric motor on a defined deviation occurring. In this connection, the control variable for the electric motor is the motor current. If the pressure in the actuator cylinder should be maintained, only the fast drain valve has to be kept closed. The pressure required for this is determined by the force of the spring acting on the slider and a specific motor current corresponds to this pressure.

The invention also relates to a system for the control of a hydraulic actuator of a friction clutch, said hydraulic actuator including the components listed in the preamble of the first claim, with the system containing a processor and a driver stage for the control of the electric motor. It is characterized in that the processor forms at least two controllers with different control behaviors and contains a selection logic which selects the output signal of the one or the other controller in dependence on whether the pressure in the actuator cylinder should be raised or lowered. This takes the fact into account that the control path in the two operating states has a different structure and behaves differently due to the interaction of the check valve and the fast drain valve. A specific pressure can thus both be set precisely and be lowered very fast again with an overall minimal consumption of electrical energy.

In a further development of the system in accordance with the invention, the one and/or the other controller is made as a cascade controller, with, in the cascade, a first controller comparing the respective control parameters with one another and forming a desired speed for the electric motor, a second controller comparing the desired speed with the actual speed of the electric motor and forming a desired electrical parameter, and a third controller comparing the desired electrical parameter with an actual electrical parameter and determining a control variable with which the electric motor is controlled. The advantages of the cascade control listed further above are thus achieved, with the increased effort on the implementation in a processor only consisting of additional measurement devices for the operating parameters fed back in the internal loops or with the measurement devices anyway being present.

The invention also relates to a friction clutch for the drivetrain of a motor vehicle comprising an actuator and which has a control system with the torque transmissible by the friction clutch being substantially proportional to the pressure in the actuator cylinder.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
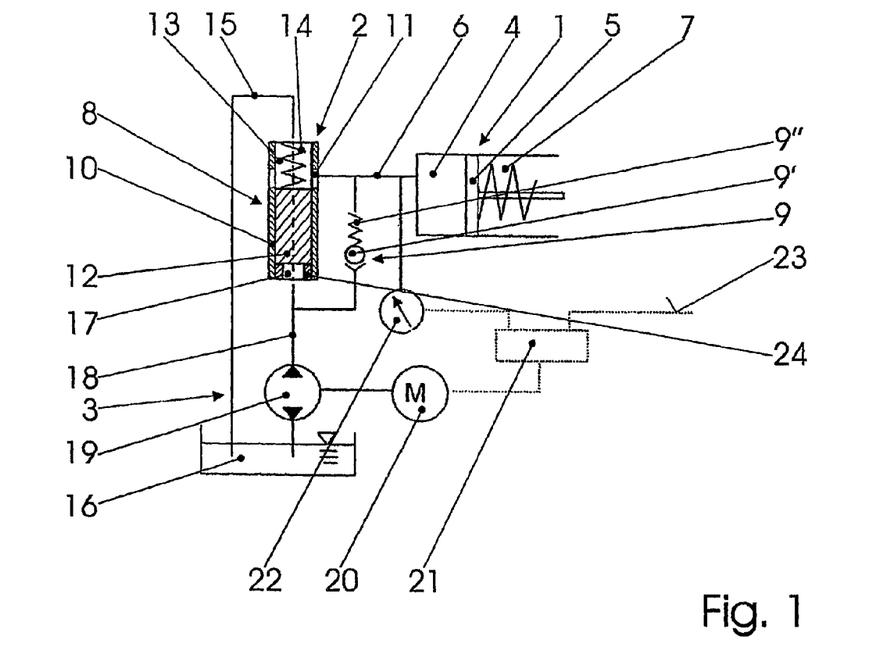
FIG. 1 illustrates a scheme of the actuator in accordance with the invention with a friction clutch.

In FIG. 1, a cylinder in piston unit is designated in summary by 1, a valve unit by 2 and an electric motor and pump unit by 3. A pressure space 4 is present in the cylinder in piston unit 1 and is in communication via a line 6 with the valve unit 2, with the pressure fluid contained in the pressure space 4 acting on a piston 5. This piston 5 is part of a friction clutch 7 or is directly in communication therewith. The friction clutch 7 is only indicated since it is of the usual construction with disks and a spring. In the friction clutch 7, the pressure exerted by the piston 5 acts against the force of this spring and of the clutch disks. As the pressure increases, the torque transmissible by the clutch increases approximately proportionally with the pressure.

The valve unit 2 contains a fast drain valve 8 and a check valve 9. The latter has a ball 9' pressed toward a seat by a spring 9". The fast drain valve 8 is formed by a socket 10 having at least one opening 11, which opening is in communication with the pressure space 4 via the line 6, and by a piston 12 displaceable in the socket 10. The piston 12 separates a first space 13 containing a compression spring 14 from a second space 17. The first space 13 is in communication via a drain line 15 with a sump 16 from which the electric motor and pump unit 3 sucks in fluid and into which it pumps fluid. A pressure line 18 is connected to the second space 17 and in turn establishes the connection between the electric motor and pump unit 3 and to the pressure space 4 via the check valve 9.

The electric motor and pump unit 3 comprises a pump for the pressure fluid and a motor 20 which is controlled by a control system 21. In the embodiment described, a permanently excited DC motor is used. As the input signal, the control system 21 receives actual values determined by sensors 22 (only a pressure sensor is indicated here) and, via a line 23, a desired value of a pressure in the actuator cylinder which generates the contact pressure acting on the disks of the clutch 7 and corresponds to the maximum torque to be transmitted by the clutch. The previously described elements form the actuator of the clutch 7.

The manner of operation of the described arrangement is as follows: In the position shown in FIG. 1, the electric motor and pump unit 3 either does not pump at all or at a pressure which is not sufficient to open the check valve 9 or to close the fast drain valve 8. No pressure is present in the pressure space 4; the clutch, which is not shown, is thus not acted on, that is does not transmit any torque. If the pressure of the pressure medium in the line 18 delivered by the pump 19 now increases, this acts in the second space 17 on the lower side of the slider 12 made as a piston against the force of the spring 14. At a specific pressure, the slider 12 starts to move upwardly, with it closing the opening 11 and thus the outflow from the pressure space 4. Only when the opening 11 is fully closed does the check valve 9 open and can pressure fluid flow into the pressure space 4 and control the clutch accordingly.

If the pump 19 is now stopped, the pressure acting on the slider 12 drops; the check valve 9 closes at the same time. The slider 12 is slowly pressed downwardly by the spring 14 (depending on the leakage of the pump), whereby the openings 11 become free again after a specific time and the pressure fluid can escape from the pressure space 4 into the sump 16. If the electric motor and pump unit 3 is now switched over such that the pumping direction also reverses, that is the pump 19 pumps out of the pressure line 18 into the sump 16, an underpressure arises under the slider 12 and substantially accelerates its downward movement. Then, on switching over of the motor 20, the clutch is fully opened for a moment as is required, for example, in the case of ABS braking.

If the pressure space 4 is under pressure and the electric motor and pump unit 3 maintains the fast drain valve closed, the pressure continues to be maintained for a while with a good seal. This means that, in steady state operation with an engaged clutch, the electric motor and pump unit 3 only has to maintain the pressure for the slider to remain closed. The output amount is almost zero since leakage mainly takes place in the interior of the pump. A substantial saving in energy is thus achieved.

Figure 2:
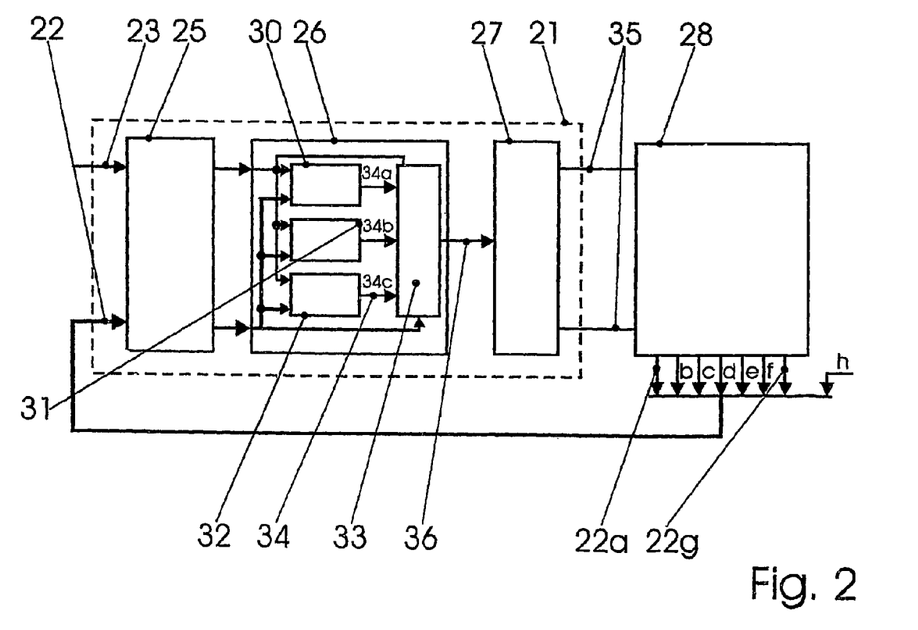
FIG. 2 is a block diagram of the control system in accordance with the invention.

In FIG. 2, the total control system 21 is shown as part of a feedback control circuit which it forms with an actuator and its control path which are here indicated together and designated by 28. Various sensors are attached to the actuator and to the control path and generate signals 22, and indeed:

22a: actual pressure ($p_{act}$) in the actuator cylinder 4;
22b: actual current strength ($I_{act}$) of the current supplied to the electric motor 20;
22c: actual voltage ($U_{act}$) of the current supplied to the motor 20;
22d: actual angle of rotation of the motor 20;
22e: actual speed of the motor 20,
22f: the actual position ($x_{act}$) of the slider 12;
22g: the position of the actuator piston 5;
22h: a signal corresponding to the pressure signal (for example, determined from other signals, for instance from a torque signal or rotational speed signal).

The actual pressure signal 22a or 22h in any case and individual ones of the further signals 22b to 22g are available to the control system 21, in the same way as a signal 23 which is emitted by a higher level control system, which indicates the desired pressure ($p_{des}$) in the actuator cylinder 4 and which is substantially proportional to the maximum torque to be transmitted by the clutch.

The control system 21 comprises in general terms an analog/digital converter 25 which makes the signals 22 and 23 available to a computing unit 26 in digital form. The latter's output signal 36 is a control variable for the motor 20 which is supplied to a driver stage 27 which controls electrical current supplied to the electric motor with respect to voltage and/or current strength. The input signal 23 can already be present in digital form and also additionally contain the width of the tolerance range.

Three controllers 30, 31, 32 and a selection logic 33 are provided in the computing unit 26. All three are arranged in parallel, they receive, as input parameters, the desired pressure 23 ($p_{des}$) and the measured signals 22, but at least the actual pressure 22a or 22h, and all three controllers provide, as the output signal, a control variable 34a, 34b, 34c for the electric motor 20, from which the selection logic 33 selects a signal 36, likewise in dependence on the desired pressure 23 ($p_{des}$) and the measured signals 22, but at least on that of the actual pressure 22a or 22h ($p_{act}$). The three controllers 30, 31, 32 connected in parallel come into effect, only one in each case, in different control situations. The first controller 30, when the desired pressure 23 ($p_{des}$) is larger than the actual pressure 22a or 22h ($p_{act}$), that is when the pressure should increase in the actuator cylinder (and the clutch should be engaged). The sign of the pressure difference designates its preceding sign, which is positive in this case. The second controller 31 acts when the pressure difference, and thus the sign, is negative, which corresponds to a dropping pressure in the actuator cylinder (and a disengagement of the clutch). Finally, a third controller can be provided to maintain the pressure. It acts when the desired pressure and the actual pressure are within the preset tolerance. It is also called a maintaining controller. The control variable 36 for the motor 20 selected by the selection logic 33 is forwarded to the driver stage 27.

Figure 3:
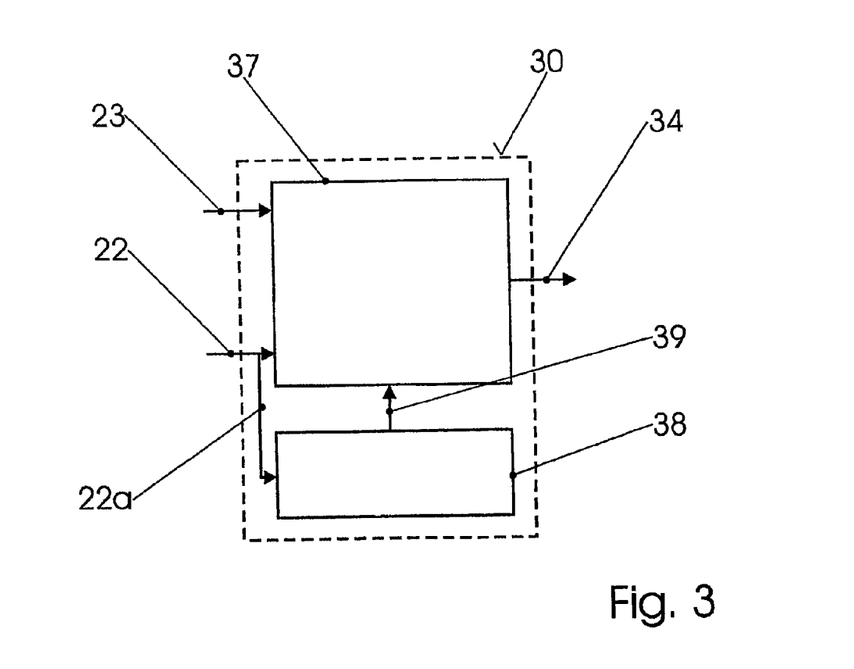
FIG. 3 illustrates a scheme of the control for a positive sign.

In FIG. 3, the first controller 30 comprises the actual controller 37 and a computer 38 for the calculation of the control parameters on the basis of individual input signals 22, in particular, but not exclusively, of the actual pressure signal 22a or 22h. The control parameters calculated by it (with a PID controller, that is the factors determining the P, I and D functions) are provided to the actual controller 37 for adaptation. The controller 30 is thus adaptive overall. This takes into account the fact that the relationship between the pressure to be overcome by the actuator piston (5) (comprising the force of the clutch springs and the contact pressure of the clutch disks required for the transmission of a specific torque) and its path is strongly non-linear. Without the adaptation function, the positioning procedure in the range of low force would take much too long. The factors describing the controller (P, I, and D factors) are therefore set in accordance with the input signals 22 and 23, in particular in accordance with the actual pressure 22a, 22h, such that the adjustment of the piston 5 corresponds to the demands on the dynamics in all ranges. The parameters determined by the computer 38 are forwarded to the actual controller 37 via the connection 39.

When a controller, a connection or a loop are spoken of in the total description, a program module is meant, when a processor is used, which carries out the corresponding control algorithm.

Figure 4:
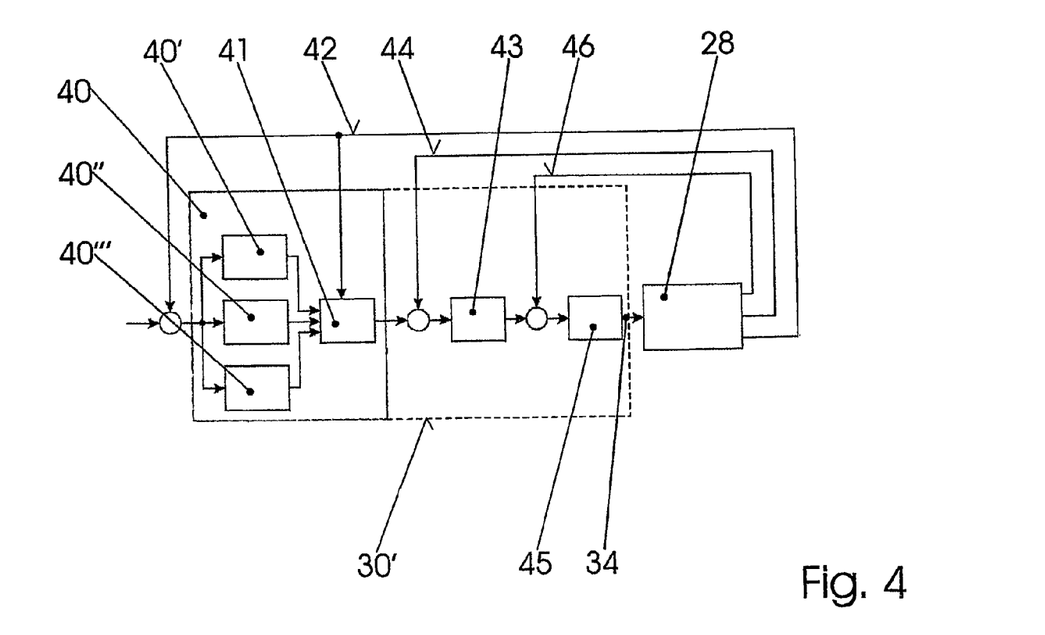
FIG. 4 illustrates a variant of the controller of FIG. 3.

In the variant of FIG. 4, the controller 30' is made as a cascade controller which comprises three sub-controllers 40, 43, 45 which are connected in cascade. The first sub-controller 40 is divided into three regions 40', 40'', 40''' with different control parameters, as an alternative solution to the adaptive controller 30 of FIG. 3. It is followed by a selection logic 41 which, like the input of the controller 40, receives the actual pressure signal ($p_{act}$) via the "line" 42; it (42) forms an outer return loop of the cascade. The output signal of the first sub-controller controller 40 is a desired speed of the motor ($n_{des}$). The second sub-controller 43 of the cascade is a speed controller to which the desired speed signal ($n_{des}$) of the first sub-controller 40 and, via a middle return loop 44, an actual speed of rotation ($n_{act}$) of the motor is supplied. The output signal is a desired current signal ($I_{des}$) for the motor. It is compared in the third sub-controller 45 with the actual current ($I_{act}$) of the motor and generates a control variable 34a for the motor 20. The actuator and the control path 28 are indicated.

Figure 5:
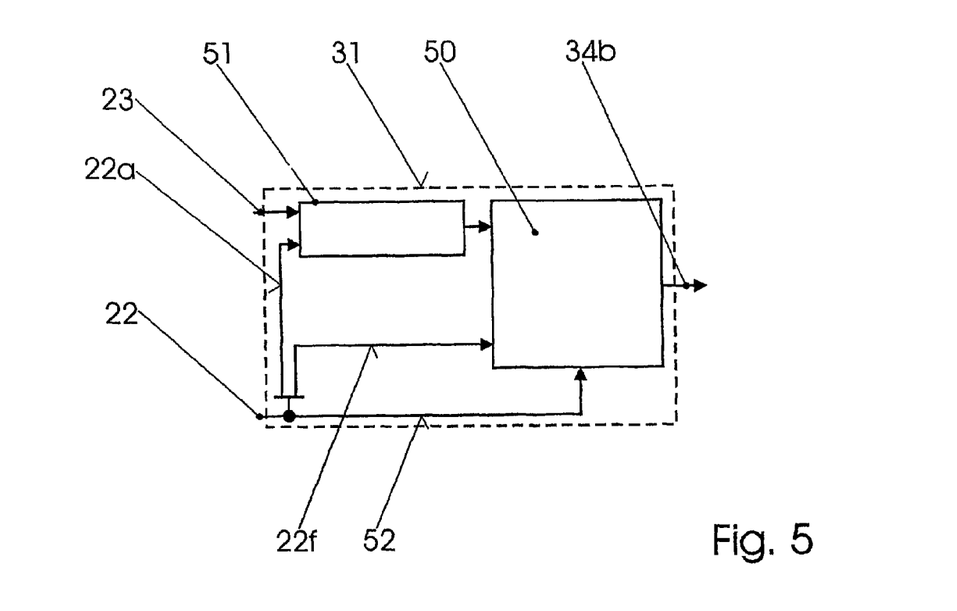
FIG. 5 illustrates a scheme of the controller for a negative sign in a first embodiment.

FIG. 5 shows the second controller 31 for a negative sign (pressure drop) in a first embodiment. An actual value 22f ($x_{act}$) corresponding to the actual position of the slider 12 and a desired value of the position of the slider 12 ($x_{des}$) are supplied to the actual controller 50. Said desired value is primarily calculated from the desired pressure 23 ($p_{des}$) in the actuator cylinder and from the actual pressure signal 22a or 22h ($p_{act}$). Further measured signals 22 can be supplied to the controller via the loop 52. The output signal 34 of the actual controller 50 is in turn a control variable 34b for the electric motor.

Figure 6:
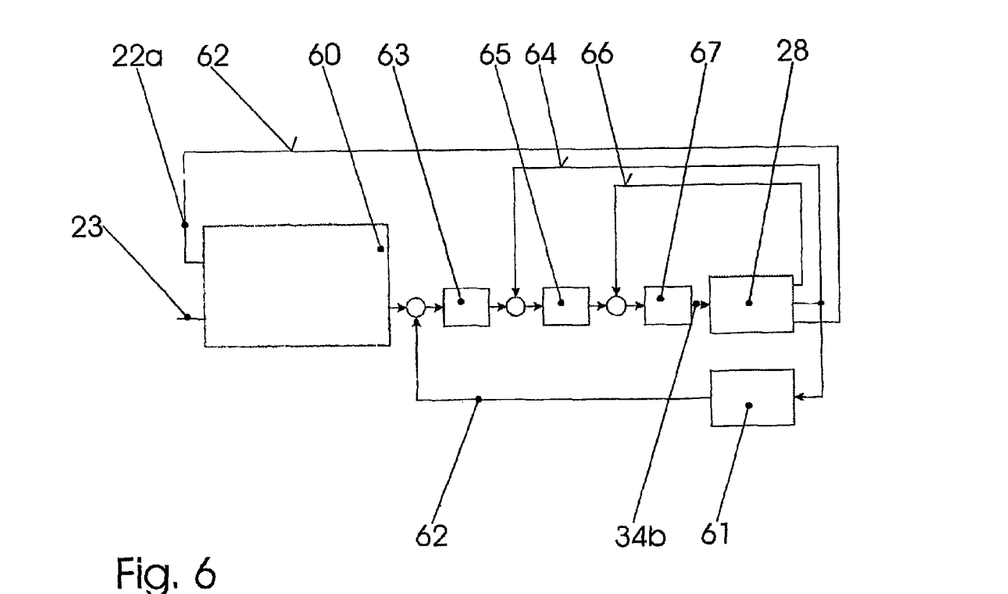
FIG. 6 illustrates a variant of the controller of FIG. 5.

In the variant of FIG. 6, the controller 31 for a negative sign is again made as a cascade controller. The computing unit 60 determines the desired position of the slider 12 ($x_{des}$) from the actual pressure 22a or 22h ($p_{act}$) and the desired pressure 23 ($p_{des}$) in the actuator cylinder 4, with the desired value ($x_{des}$) of the position of the slider 12 being a function of the through-flow cross-section of the opening 11. In a first sub-controller 63, a desired speed of the motor ($n_{des}$) is determined from the desired value ($x_{des}$) of the position of the slider 12 and from its actual value ($x_{act}$), which is determined in a computing unit 61 from the signals 22, preferably from the actual angle of rotation 22d, actual speed of rotation ($n_{act}$) of the motor. The actual position ($x_{act}$) of the slider 12 is supplied to the first sub-controller 63 (a position controller) via an external return loop 62. In a second sub-controller 65 (a speed controller), a desired current ($I_{des}$) for the motor is calculated from the desired speed of rotation ($n_{des}$) of the motor and an actual speed of rotation ($n_{act}$) of the motor communicated via a middle return loop 64. This desired current ($I_{des}$) is in turn compared with the actual current ($I_{act}$) supplied via an internal return loop 66 and a control variable 34b for the electric motor is determined from this in a third sub-controller 67 (a current controller).

Figure 7:
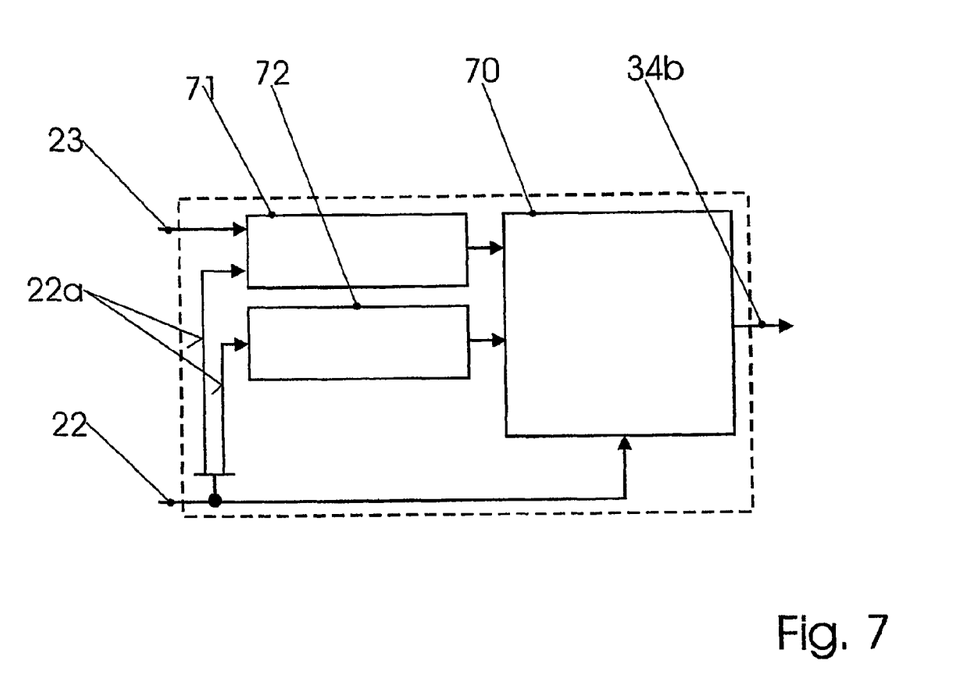
FIG. 7 illustrates a scheme of the controller for a negative sign in a second embodiment.

FIG. 7 shows a second embodiment of the second controller 31 (negative sign) which differs from that of FIG. 5 in that, instead of the desired position ($x_{des}$) of the slider 12, the pressure gradient (dp/dt) is used as the input parameter. The actual controller 70 compares a desired value ($dp/dt_{des}$) of the pressure gradient with an actual value ($dp/dt_{act}$) of the pressure gradient. The first is calculated in a computing unit 71 from the desired pressure 23 ($p_{des}$) and the actual pressure 22a or 22h ($p_{act}$) in the actuator cylinder 4. The second is determined in a unit 72 from the actual pressure signal 22a or 22h ($p_{act}$). The output value is again the control variable 34b for the electric motor.

The description is merely exemplary in nature and, thus, variations that do not depart from the gist of the present disclosure are intended to be within the scope of the invention. Such variations are not to be regarded as a departure from the spirit and scope of the present disclosure.

The invention claimed is:

1. A method for controlling a hydraulic actuator of a friction clutch, which comprises:
   a) a pump driven by an electric motor that is controlled by a control system;
   b) a pressure line, which contains a check valve and which runs from the pump to an actuator cylinder having an actuator piston acting on the friction clutch, with a pressure in the actuator cylinder to be controlled; and
   c) a fast drain valve, which is in flow communication with the actuator cylinder and includes a slider responsive to the pressure prevailing at the side of the pump facing it;
   the method comprising:
   determining a control variable for the electric motor from a desired pressure and an actual pressure in the actuator cylinder; and
   executing at least two different control algorithms depending on a sign of a difference between the desired pressure and actual pressure wherein, with a positive sign, the control algorithm is that of a cascade controller such that a desired speed ($n_{des}$) of the electric motor is determined in a first sub-controller from the desired pressure and the actual pressure in the actuator cylinder, a desired electrical parameter ($I_{des}$) is determined in a second sub-controller from the desired speed ($n_{des}$) and an actual speed ($n_{act}$) of the electric motor and a control variable for controlling the electric motor is determined in a third sub-controller from the desired electrical parameter ($I_{des}$) and an actual electric parameter ($I_{act}$).

2. The method in accordance with claim 1, wherein the control parameters of the first sub-controller are adapted in dependence on operating parameters including the actual pressure in the actuator cylinder.

3. The method in accordance with claim 1, wherein, with a negative sign, the control algorithm forms a control variable for the electric motor by a comparison of a desired position ($x_{des}$) of the slider of the fast drain valve with its actual position ($x_{act}$), with the desired position of the slider being formed from the desired pressure and the actual pressure in the actuator cylinder.

4. The method in accordance with claim 3, wherein the actual position ($x_{act}$) of the slider is determined from at least one operating parameter of the actuator.

5. The method in accordance with claim 4, wherein the at least one operating parameters for the determination of the position of the slider is a parameter corresponding to the angle of rotation of the electric motor.

6. The method in accordance with claim 1, wherein, with a negative sign, the control algorithm forms a control variable for the electric motor by a comparison of a desired gradient ($dp/dt_{des}$) with an actual gradient ($dp/dt_{act}$) of the pressure in the actuator cylinder, with the desired gradient ($dp/dt_{des}$) being formed as a function of the desired pressure and of the actual pressure in the actuator cylinder and the actual gradient ($dp/dt_{act}$) being formed by time derivation of the actual pressure in the actuator cylinder.

7. The method in accordance with claim 1, wherein, with a negative sign, the control algorithm is that of a second cascade controller such that a desired speed ($n_{des}$) of the electric motor is determined in a first sub-controller from a desired position ($x_{des}$) and an actual position ($x_{act}$) of the slider, a desired electric parameter ($I_{des}$) is determined in a second sub-controller from the desired speed ($n_{des}$) and an actual speed ($n_{act}$) of the electric motor, and a control variable with which the electric motor is controlled is determined in a third sub-controller from the desired electrical parameter ($I_{des}$) and an actual electrical parameter ($I_{act}$).

8. The method in accordance with claim 1, wherein, when the sign of the difference of the desired pressure and actual pressure is equal to zero, the control algorithm monitors the actual pressure in the actuator cylinder and forms a control variable for the electric motor at a defined pressure drop.

9. The method in accordance with claim 1, wherein, when the sign of the difference of the desired pressure and actual pressure is equal to zero, the control algorithm monitors the position (x) of the slider and forms a control variable for the electric motor on a defined deviation.

10. The method in accordance with claim 9, wherein the control parameter for the electric motor is the motor current or the motor voltage for the holding closed of the fast drain valve, with in particular the motor current or the motor voltage being kept constant.

11. A method for controlling actuation of a friction clutch, comprising:
providing a hydraulic actuator including a pump, an electric motor driving the pump, a pressure line connecting an outlet of the pump to an actuator cylinder, an actuator piston disposed in the actuator cylinder and acting on the friction clutch in response to a fluid pressure within the actuator cylinder, a check valve in the pressure line, and a fast drain valve in flow communication with the actuator cylinder and having a slider responsive to a fluid pressure at the outlet of the pump; and
controlling the fluid pressure in the actuator cylinder by determining a control variable for the electric motor based on a difference between a desired pressure value ($p_{des}$) and an actual pressure value ($p_{act}$) in the actuator cylinder, and executing at least two different control algorithms depending on whether a sign for the difference between the desired pressure value ($p_{des}$) and the actual pressure value ($p_{act}$) is positive or negative;
wherein with a positive sign, the control algorithm is that of a cascade controller, with a desired speed ($n_{des}$) of the electric motor being determined in a first sub-controller from the desired pressure value ($p_{des}$) and the actual pressure value ($p_{act}$) in the actuator cylinder, a desired electrical parameter ($I_{des}$) being determined in a second sub-controller from the desired speed ($n_{des}$) and an actual speed ($n_{act}$) of the electric motor and wherein the control variable for controlling the electric motor is determined in a third sub-controller from the desired electrical parameter ($I_{des}$) and an actual electric parameter ($I_{act}$).

12. The method in accordance with claim 11, wherein with a negative sign, the other control algorithm forms a control variable for the electric motor by a comparison of a desired position ($x_{des}$) of the slider of the fast drain valve with an actual position ($x_{act}$), with the desired position of the slider being formed from the desired pressure value ($p_{des}$) and the actual pressure value ($p_{act}$) in the actuator cylinder.

13. The method in accordance with claim 12 wherein the other control algorithm is that of a second cascade controller having a first sub-controller comparing the respective desired values ($p_{des}$; $x_{des}$) and the respective actual values ($p_{act}$; $x_{act}$) with one another and forming a desired speed ($n_{des}$) for the electric motor, a second sub-controller comparing the desired speed ($n_{des}$) of the electric motor with the actual speed ($n_{act}$) and forming a desired electrical parameter ($I_{des}$), and a third sub-controller comparing the desired electrical parameter ($I_{des}$) with an actual electrical parameter ($I_{act}$) and determining a control parameter with which the electric motor is controlled.

14. The method in accordance with claim 11 further comprising the step of providing a control system including a processor and a driver stage for the control of the electric motor, and wherein the processor forms at least two controllers with different control behaviors and includes a selection logic which selects the output signal of one of the at least two controllers depending on whether the pressure in the actuator cylinder should be raised or lowered.

15. A method for controlling a hydraulic actuator of a friction clutch, the hydraulic actuator including a pump driven by an electric motor, a control system controlling the electric motor, a pressure line connecting an outlet of the pump to an actuator cylinder, an actuator piston disposed in the actuator cylinder and acting on the friction clutch in response to fluid pressure in the actuator cylinder, a check valve in the pressure line, and a fast drain valve in flow communication with the actuator cylinder and having a slider responsive to the fluid pressure at the pump outlet, the method comprising:
determining a control variable for the electric motor from a desire pressure and an actual pressure in the actuator cylinder; and
executing at least two different control algorithms depending on a sign of a difference between the desired pressure and actual pressure, wherein, with a negative sign, the control algorithm forms the control variable for the electric motor by a comparison of a desired gradient ($dp/dt_{des}$) with an actual gradient ($dp/dt_{act}$) of the pressure in the actuator cylinder, with the desired gradient ($dp/dt_{des}$) being formed as a function of the desired pressure and of the actual pressure in the actuator cylinder and the actual gradient ($dp/dt_{act}$) being formed by time derivation of the actual pressure in the actuator cylinder.

16. The method in accordance with claim 15 wherein, with a positive sign, the other control algorithm is that of a cascade controller such that a desired speed ($n_{des}$) of the electric motor is determined in a first sub-controller from the desired pressure and the actual pressure in the actuator cylinder, a desired electrical parameter ($I_{des}$) is determined in a second sub-controller from the desired speed ($n_{des}$) and an actual speed of the electric motor, and the control variable for controlling the electric motor is determined in a third sub-controller from the desired electrical parameter ($I_{des}$) and an actual electric parameter ($I_{act}$).

17. A method for controlling a hydraulic actuator of a friction clutch, the hydraulic actuator including a pump driven by an electric motor, a control system controlling the electric motor, a pressure line connecting an outlet of the pump to an actuator cylinder, an actuator piston disposed in the actuator cylinder and acting on the friction clutch in response to fluid pressure in the actuator cylinder, a check valve in the pressure line, and a fast drain valve in flow communication with the actuator cylinder and having a slider responsive to the fluid pressure at the pump outlet, the method comprising:
determining a control variable for the electric motor from a desire pressure and an actual pressure in the actuator cylinder; and executing at least two different control algorithms depending on a sign of a difference between the desired pressure and actual pressure, wherein, with a negative sign, the control algorithm is that of a cascade controller such that a desired speed ($n_{des}$) of the electric motor is determined in a first sub-controller from a desired position ($x_{des}$) and an actual position ($x_{act}$) of the slider, a desired electric parameter ($I_{des}$) is determined in a second sub-controller from the desired speed ($n_{des}$) and an actual speed ($n_{act}$) of the electric motor, and the control variable for controlling the electric motor is determined in a third sub-controller from the desired electrical parameter ($I_{des}$) and an actual electrical parameter ($I_{act}$).

18. The method in accordance with claim 17, wherein the actual position ($X_{act}$) of the slider is determined from at least one operating parameter of the actuator, and wherein the operating parameter for determination of the position of the slider is a parameter corresponding to the angle of rotation of the electric motor.

19. A method for controlling a hydraulic actuator of a friction clutch, the hydraulic actuator including a pump driven by an electric motor, a control system controlling the electric motor, a pressure line connecting an outlet of the pump to an actuator cylinder, an actuator piston disposed in the actuator cylinder and acting on the friction clutch in response to fluid pressure in the actuator cylinder, a check valve in the pressure line, and a fast drain valve in flow communication with the actuator cylinder and having a slider responsive to the fluid pressure at the pump outlet, the method comprising:
    determining a control variable for the electric motor from a desire pressure and an actual pressure in the actuator cylinder; and
    executing at least two different control algorithms depending on a sign of a difference between the desired pressure and actual pressure, wherein, when the sign of the difference of the desired pressure and actual pressure is equal to zero, a control algorithm monitors the actual pressure in the actuator cylinder and forms the control variable for the electric motor at a defined pressure drop.

20. A method for controlling a hydraulic actuator of a friction clutch, the hydraulic actuator including a pump driven by an electric motor, a control system controlling the electric motor, a pressure line connecting an outlet of the pump to an actuator cylinder, an actuator piston disposed in the actuator cylinder and acting on the friction clutch in response to fluid pressure in the actuator cylinder, a check valve in the pressure line, and a fast drain valve in flow communication with the actuator cylinder and having a slider responsive to the fluid pressure at the pump outlet, the method comprising:
    determining a control variable for the electric motor from a desire pressure and an actual pressure in the actuator cylinder; and
    executing at least two different control algorithms depending on a sign of a difference between the desired pressure and actual pressure, wherein, when the sign of the difference of the desired pressure and actual pressure is equal to zero, a control algorithm monitors the position (x) of the slider and forms the control variable for the electric motor based on a defined deviation.

21. The method in accordance with claim 20, wherein the control parameter for the electric motor is the motor current or the motor voltage for holding closed of the fast drain valve.

22. A method for controlling a hydraulic actuator of a friction clutch, the hydraulic actuator including a pump driven by an electric motor, a control system controlling the electric motor, a pressure line connecting an outlet of the pump to an actuator cylinder, an actuator piston disposed in the actuator cylinder and acting on the friction clutch in response to fluid pressure in the actuator cylinder, a check valve in the pressure line, and a fast drain valve in flow communication with the actuator cylinder and having a slider responsive to the fluid pressure at the pump outlet, the method comprising:
    determining a control variable for the electric motor from a desire pressure and an actual pressure in the actuator cylinder; and
    executing at least two different control algorithms depending on a sign of a difference between the desired pressure and actual pressure;
    wherein, with a negative sign, the control algorithm forms the control variable for the electric motor by a comparison of a desired position ($x_{des}$) of the slider of the fast drain valve with its actual position ($x_{act}$), with the desired position of the slider being formed from the desired pressure and the actual pressure in the actuator cylinder, wherein the actual position ($x_{act}$) of the slider is determined from at least one operating parameter of the actuator which includes a parameter corresponding to the angle of rotation of the electric motor.

23. A method for controlling actuation of a friction clutch, comprising:
    providing a hydraulic actuator including a pump, an electric motor driving the pump, a pressure line connecting an outlet of the pump to an actuator cylinder, an actuator piston disposed in the actuator cylinder and acting on the friction clutch in response to a fluid pressure within the actuator cylinder, a check valve in the pressure line, and a fast drain valve in flow communication with the actuator cylinder and having a slider responsive to a fluid pressure at the outlet of the pump; and
    controlling the fluid pressure in the actuator cylinder by determining a control variable for the electric motor based on a difference between a desired pressure value ($p_{des}$) and an actual pressure value ($p_{act}$) in the actuator cylinder, and executing at least two different control algorithms depending on whether a sign for the difference between the desired pressure value ($p_{des}$) and the actual pressure value ($p_{act}$) is positive or negative;
    wherein with a negative sign, the control algorithm forms the control variable for the electric motor by a comparison of a desired position ($x_{des}$) of the slider of the fast drain valve with an actual position ($x_{act}$), with the desired position of the slider being formed from the desired pressure value ($p_{des}$) and the actual pressure value ($p_{act}$) in the actuator cylinder, wherein the control algorithm is that of a cascade controller having a first sub-controller comparing the respective desired values ($p_{des}$; $x_{des}$) and the respective actual values ($p_{act}$; $x_{act}$) with one another and forming a desired speed ($n_{des}$) for the electric motor, a second sub-controller comparing the desired speed ($n_{des}$) of the electric motor with the actual speed ($n_{act}$) and forming a desired electrical parameter ($I_{des}$), and a third sub-controller comparing the desired electrical parameter ($I_{des}$) with an actual electrical parameter ($I_{act}$) and determining the control variable with which the electric motor is controlled.

\* \* \* \* \*

UNITED STATES PATENT AND TRADEMARK OFFICE
CERTIFICATE OF CORRECTION

PATENT NO. : 8,145,400 B2
APPLICATION NO. : 11/667245
DATED : March 27, 2012
INVENTOR(S) : Albert Kusej et al.

It is certified that error appears in the above-identified patent and that said Letters Patent is hereby corrected as shown below:

On the Title Page:

Item (73) Assignee: "Magna Drivetrain AG & Co. KG, Lannach (AT)" should be
Magna Drivetrain AG & Co. KG, Lannach (AT)
-- Technische Universität Graz, Graz (AT) --

Signed and Sealed this
Twenty-second Day of January, 2013

David J. Kappos
*Director of the United States Patent and Trademark Office*